United States Patent
Qiu et al.

(10) Patent No.: US 8,533,348 B2
(45) Date of Patent: Sep. 10, 2013

(54) FAILOVER COMMUNICATION SERVICES

(75) Inventors: Chaoxin Qiu, Austin, TX (US); Robert F. Dailey, Austin, TX (US); Jeffrey L. Scruggs, Round Rock, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 74 days.

(21) Appl. No.: 13/275,556

(22) Filed: Oct. 18, 2011

(65) Prior Publication Data

US 2013/0097330 A1 Apr. 18, 2013

(51) Int. Cl.
G06F 15/16 (2006.01)
(52) U.S. Cl.
USPC ........... 709/228; 709/227; 709/225; 370/216; 370/225; 370/254; 370/352; 370/328
(58) Field of Classification Search
USPC ................. 709/225, 227, 228; 370/216, 225, 370/254, 352, 328
See application file for complete search history.

(56) References Cited

U.S. PATENT DOCUMENTS

| | | | |
|---|---|---|---|
| 8,230,073 B1* | 7/2012 | Leeder et al. | 709/227 |
| 8,239,705 B2* | 8/2012 | Qiu et al. | 714/4.2 |
| 2008/0247396 A1 | 10/2008 | Hazard | |
| 2009/0077413 A1 | 3/2009 | Dake | |
| 2009/0161666 A1* | 6/2009 | Ku | 370/356 |
| 2010/0034194 A1* | 2/2010 | Fieremans et al. | 370/352 |
| 2010/0039930 A1 | 2/2010 | Liang | |
| 2010/0287406 A1* | 11/2010 | Ishii | 714/4 |

OTHER PUBLICATIONS

Calhoun, P., "Diameter Base Protocol", Network Working Group, The Internet Society (2003), 148 pages.

* cited by examiner

*Primary Examiner* — Wing F Chan
*Assistant Examiner* — Hitesh Patel
(74) *Attorney, Agent, or Firm* — Guntin & Gust, PLC; Ed Guntin

(57) ABSTRACT

A system that incorporates teachings of the subject disclosure may include, for example, a home subscriber server having a memory coupled to a processor. The processor can be configured to store a first identity of a first communication device registered with a primary communication resource and a secondary communication resource, receive a request associated with a registration request initiated by a second communication device, detect that a second identity of the second communication device matches the first identity of the first communication device, and direct a registration of the second communication device with at least one of the primary communication resource or the secondary communication resource responsive to the detected match. Other embodiments are disclosed.

18 Claims, 8 Drawing Sheets

200

600

FAILOVER COMMUNICATION SERVICES

RELATED APPLICATION

U.S. patent application Ser. No. 12/948,984, filed Nov. 18, 2010, entitled "Communication Device for Configuring Failover Communication Services." All sections of the aforementioned application are incorporated herein by reference.

FIELD OF THE DISCLOSURE

The subject disclosure relates generally to failover communication services.

BACKGROUND

In packet-switched communication systems, such as an Internet Protocol Multimedia Subsystem (IMS) network, it may be common for millions of communication devices to register with a server office of the IMS network. When a server office fails to provide services due to a catastrophic event such as an earthquake or other unexpected event, the communication devices may overload the IMS network with registration requests to other server offices that could adversely affect the performance of the IMS network.

BRIEF DESCRIPTION OF THE DRAWINGS

Reference will now be made to the accompanying drawings, which are not necessarily drawn to scale, and wherein.

DETAILED DESCRIPTION

Figure 1:
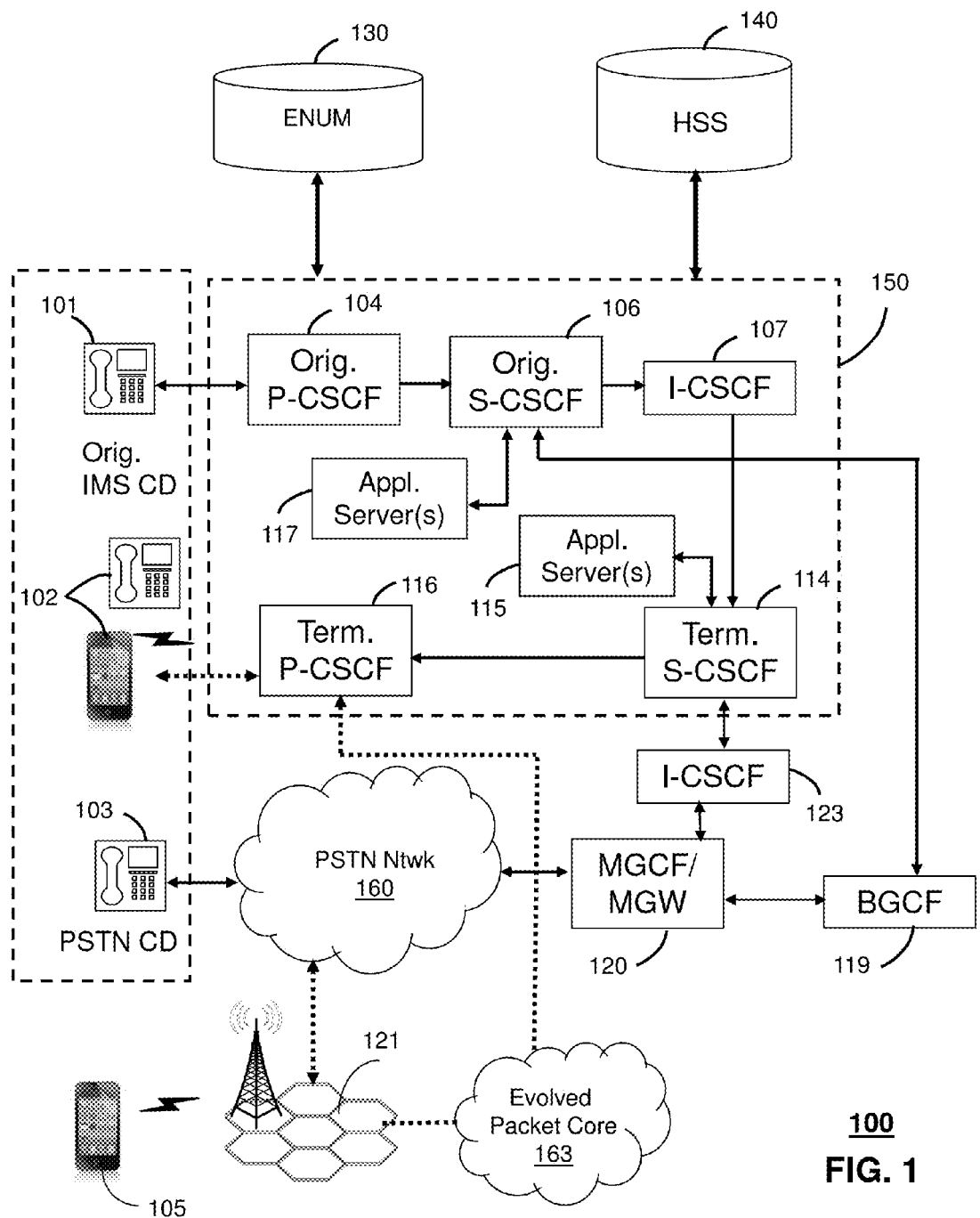
FIGS. 1-2 depict illustrative embodiments of communication systems.

The subject disclosure may describe, among other things, illustrative embodiments to avoid excessive re-registration requests initiated by communication devices due to a communication fault in an Internet Protocol Multimedia Subsystem (IMS) network that supplies communication services to a population of communication devices. An embodiment of the subject disclosure may avoid excessive re-registrations as a result of communication devices initiating a registration process with primary and secondary communication resources in an IMS network, and utilizing the secondary communication resource when initiating a call responsive to detecting the unavailability of the primary communication resource.

One embodiment of the subject disclosure may include a communication device having at least one memory coupled to at least one processor, wherein the at least one memory includes a set of instructions (e.g., computer-executable instructions, software, etc.). The set of instructions, when executed by at least one processor, may cause or configure the at least one processor or the communication device to perform one or more of the following: transmit a first Session Initiation Protocol (SIP) registration message to an Internet Protocol Multimedia Subsystem (IMS) network, receive a first acknowledgment from the IMS network indicating that the communication device has registered with a primary communication resource in the IMS network, transmit a second SIP registration message to the IMS network, wherein the second SIP registration message comprises an indicator for registering the communication device with a secondary communication resource in the IMS network, and/or receive a second acknowledgment from the IMS network indicating that the communication device has registered with the secondary communication resource. The set of instructions, when executed by at least one processor, may further cause or configure at least one processor or the communication device to perform one or more of the following: transmit a first SIP request message to the primary communication resource of the IMS network to establish a communication session with a second communication device, detect that the primary communication resource of the IMS network is unavailable to establish the communication session, and/or transmit a second SIP request message to the secondary communication resource to establish the communication session with the second communication device.

One embodiment of the subject disclosure may include an Interrogating Serving Call Session Control Function (I-CSCF) device having at least one memory coupled to at least one processor, where the at least one memory includes a set of instructions. The set of instructions, when executed by at least one processor, may cause or configure at least one processor or the I-CSCF device to perform one or more of the following: receive a first registration request initiated by a first communication device, transmit a request to a Home Subscriber Server (HSS) device responsive to receiving the first registration request, receive from the HSS a first message comprising a first identity of a primary communication resource, where the HSS device transmits the first message responsive to detecting that a first identity of the first communication device matches a second identity of a second communication device, and where the second communication device is registered with the primary communication resource, and register the first communication device with the primary communication resource.

One embodiment of the subject disclosure may describe an HSS having at least one memory coupled to at least one processor, where the at least one memory includes a set of instructions. The set of instructions, when executed by at least one processor, may cause or configure at least one processor or the HSS device to perform one or more of the following: store a first identity of a first communication device registered with a primary communication resource and a secondary communication resource, receive a request associated with a registration request initiated by a second communication device, detect that a second identity of the second communication device matches the first identity of the first communication device, and/or direct a registration of the second communication device with at least one of the primary communication resource or the secondary communication resource responsive to the detected match.

For illustration purposes only, the terms S-CSCF device, P-CSCF device, I-CSCF device, and so on, can be used without the word "device."

FIG. 1 depicts an illustrative embodiment of a communication system 100 employing an IMS network architecture to facilitate the combined services of circuit-switched and packet-switched communication services. Communication system 100 can comprise an HSS 140, a tElephone NUmber Mapping (ENUM) server 130, and other common network elements of an IMS network 150. The IMS network 150 can establish communications between or among IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 may not be necessary when a communication session involves IMS CD to IMS CD communications. A communication session involving at least one PSTN CD, however, may utilize the MGCF 120. It will be appreciated that IMS CDs 101, 102 can support packet-switched voice and packet-switched data communications and/or Long Term Evolution (LTE) communications protocol. Various IMS CDs 101, 102 may be embodied as cellular phones, smart phones, tablet computers, laptop computers, portable communication devices, appliances, and the like, whether wired or wireless.

IMS CDs 101, 102 can register with the IMS network 150 by establishing communications with a Proxy Call Session Control Function (P-CSCF) which communicates with an Interrogating CSCF (I-CSCF). The I-CSCF in turn can communicate with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which can communicate with a corresponding originating S-CSCF 106. The originating S-CSCF 106 can submit the SIP INVITE message to one or more application servers (AS) 117 that can provide a variety of services to IMS subscribers.

For example, one or more application servers 117 can be used to perform originating call feature treatment functions on the calling party number received by the originating S-CSCF 106 according to the SIP INVITE message. Originating treatment functions can include determining whether the calling party number has international calling services, call ID blocking, calling name blocking, 7-digit dialing, and/or is requesting special telephony features (e.g., *72 for forwarding calls, *73 for canceling call forwarding, *67 for caller ID blocking, and so on). Based on initial filter criteria (iFCs) in a subscriber profile associated with a CD, one or more application servers may be invoked to provide various call originating feature services.

The originating S-CSCF 106 can submit queries to the ENUM system 130 to translate an E.164 telephone number in the SIP INVITE message to a SIP Uniform Resource Identifier (URI) if the terminating CD is IMS-compliant. The SIP URI can be used by an I-CSCF 107 to submit a query to the HSS 140 to identify a terminating S-CSCF 114 associated with a terminating IMS CD such as CD 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in a subscriber profile, one or more terminating application servers 115 may also be invoked to provide various call terminating feature services, such as call forwarding no answer, do not disturb, music tones, simultaneous ringing, sequential ringing, etc.

If the terminating communication device is instead a PSTN CD such as CD 103 or CD 105 (e.g., where the cellular phone 105 or other communication device only supports circuit switched voice communications via base station 121), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

It is further noted that cellular access base station 121 of FIG. 1 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Multiple wireline and wireless communication technologies are also contemplated for the CDs of FIG. 1.

In the case where CD 105 and base station 121 support packet-switched voice and packet-switched data communications (e.g., LTE) or are otherwise IMS-compliant, the CD 105 may communicate via the cellular base station 121 and an Evolved Packet Core (EPC) 163 directly with the IMS network 150 as noted by the dotted lines interconnecting them. In this instance, CD 105 can operate as an IMS-compliant communication device.

When establishing communications between IMS CDs 101 and 102, the communication process can be symmetric such that depending on which device is initiating the call, the terms "originating" and "terminating" can be interchangeable. In the case of asymmetric communications such as IMS CD 101 initiating communications with PSTN CD 103, the communication request can follow the sequence of P-CSCF 104 to S-CSCF 106, S-CSCF 106 to BGCF 119, BGCF 119 to MGCF/MGW 120, MGCF/MGW 120 to PSTN Network 160, and PSTN Network 160 to PSTN CD 103. If the PSTN CD 103 were to initiate communications with IMS CD 101, the communication request can follow the sequence of PSTN Network 160 to MGCF/MGW 120, MGCF/MGW 120 to I-CSCF 123, I-CSCF 123 to S-CSCF 114, S-CSCF 114 to I-CSCF 107, I-CSCF 107 to S-CSCF 106, S-CSCF 106 to P-CSCF 104, and P-CSCF 104 to IMS CD 103.

It is further noted that the communication system 100 can be adapted to support video conferencing. It is also contemplated that the CDs of FIG. 1 can operate as wireline or wireless devices. The CDs of FIG. 1 can further be communicatively coupled to the cellular base station 121, a femtocell (not shown), a WiFi router, a DECT base unit, or another suitable wireless access unit to establish communications with the IMS network 150 of FIG. 1.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The IMS network 150 of FIG. 1 also represents a single instance of network elements commonly utilized for end-to-end communications. In practice, however, there can be many instances of the IMS network elements shown in FIG. 1. Several instances of S-CSCF's and application servers can be clustered into a server office which provides communication services to potentially millions of subscribers. The P-CSCF's can be clustered in access offices with session border controllers (not shown in FIG. 1).

Figure 2:
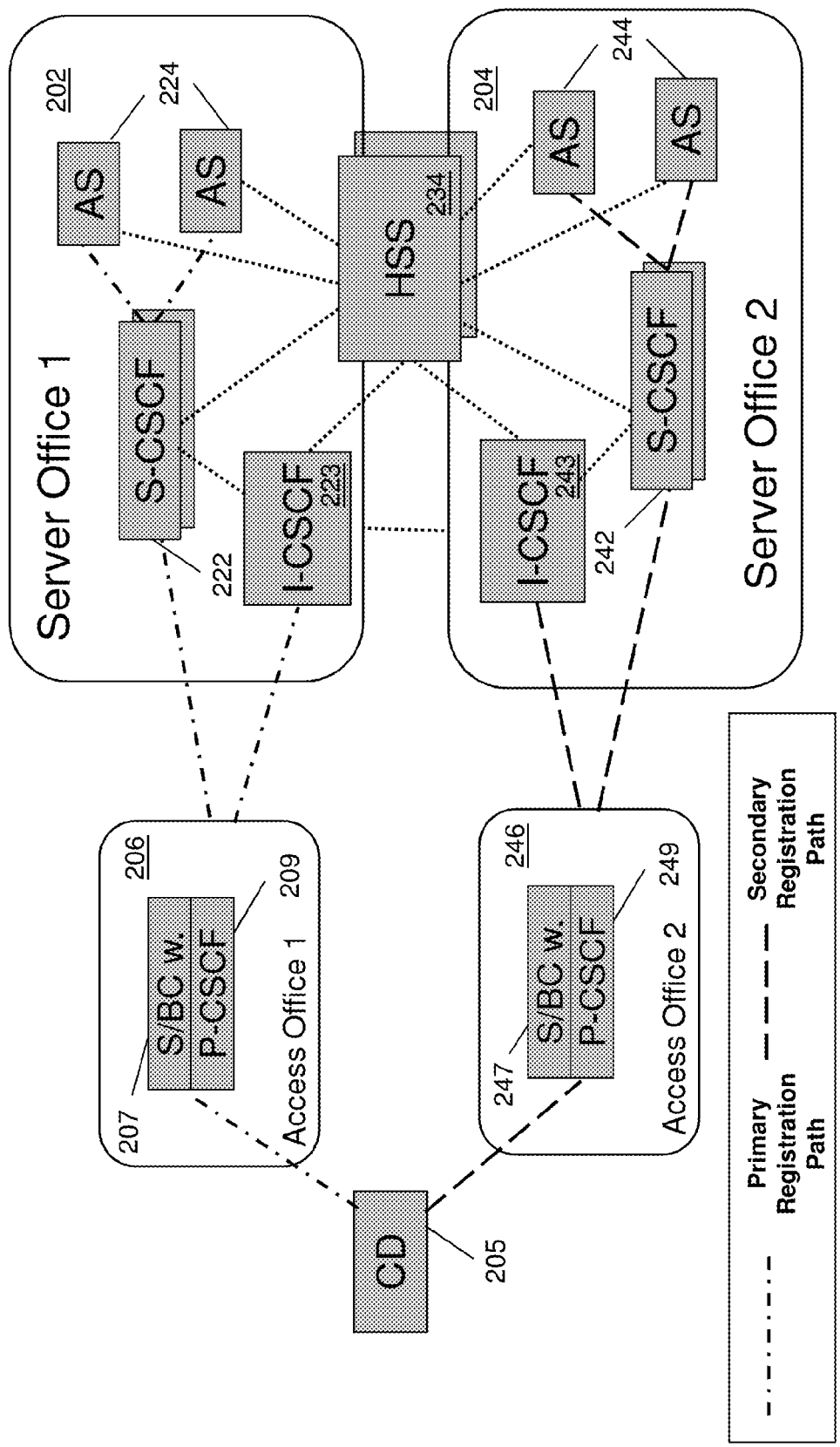

FIG. 2 illustrates first and second server offices 202 and 204. A communication device 205 can gain access to either of server offices 202 or 204 by way of first and second access offices 206 and 246, each having a session border controller and P-CSCF pair. One or more instances of I-CSCF and HSS can be accessed by the network elements of either of server offices 202 and 204, or the access offices 206 and 246 as shown by the dotted lines.

Server offices 202 and 204 can provide communication services to CD 205 by way of the S/BC 207 and P-CSCF 209 of access office 206, and the S/BC 247 and P-CSCF 249 of access office 246, respectively. As will be described by the methods of FIGS. 3-6, server office 202 can serve as a primary communication resource for serving the communication needs of CD 205. Server office 204 may serve as a secondary communication resource for serving the communication needs of CD 205 when an unrecoverable or serious fault is detected, or any network element of server office 202 is otherwise unavailable as will be described by the methods of FIGS. 3-6.

Figure 3:
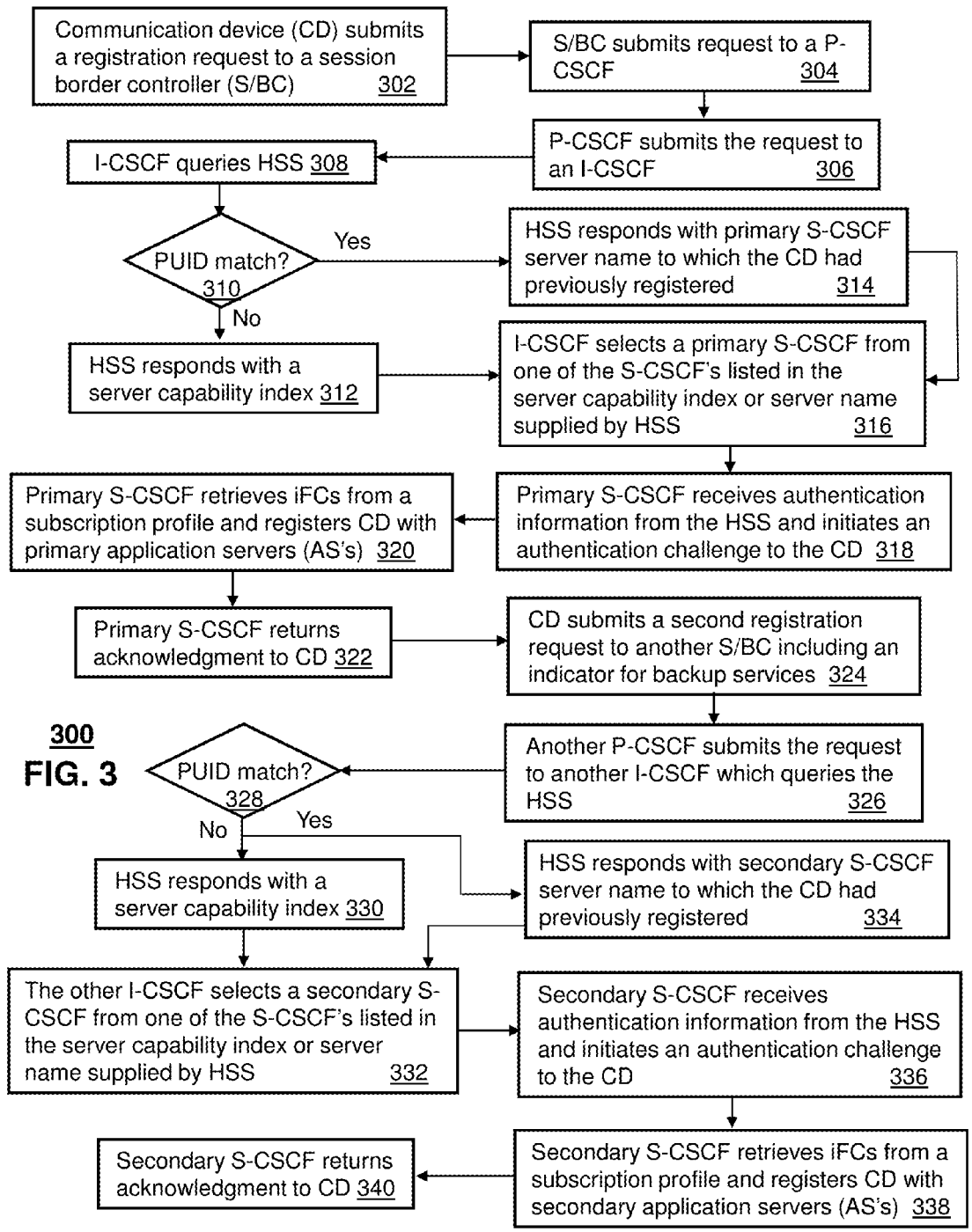
FIG. 3-6 depict illustrative embodiments of methods operating in portions of the systems described in FIGS. 1-2.

Method 300 of FIG. 3 will be described in conjunction with the flow diagrams of FIGS. 7-8. Method 300 can begin with step 302 in which a communication device such as the CD 205 of FIG. 2 submits a SIP registration request to access office 206. The S/BC 207 submits, at step 304, the request to the P-CSCF 209 of access office 206—see, e.g., step 702 of FIG. 7. At step 306, the P-CSCF 209 submits the registration request to an I-CSCF 223 of the primary server office 202 (see step 704 of FIG. 7). The I-CSCF 223 then transmits to the HSS 234 at step 308 a DIAMETER message in the form of a user authorization request (UAR), at step 706 of FIG. 7. The UAR message queries the HSS 234 for necessary information to register the CD 205.

At step 310, the HSS 234 can determine if the public user identity (PUID) of CD 205 matches a PUID of another communication device which has pre-registered with a primary and secondary communication resource of the IMS network 200. It may be common for users to utilize more than one communication device (e.g., laptop, cellular phone, home landline phone, etc.) with the IMS network 200. Under these circumstances, each communication device of the user can share a common PUID. In an example embodiment, a PUID can be a SIP URI (e.g., sip: user@operator) or a telephone (e.g., +1-234-456-6789). The communication devices may be distinguishable only by their Private User ID (PRID) or another unique identifier. If the HSS 234 detects that the PUID of the CD 205 does not match the PUID of other devices, then this condition may indicate to the HSS 234 that the CD 205 may be the first of a plurality of communication devices of the user which is registering with the IMS network 200 of FIG. 2. In this case, the HSS 234 responds to an I-CSCF at step 314 with a UAA message comprising the primary S-CSCF server name. It is I-CSCF's decision whether or not to send the registration to the same S-CSCF.

Figure 7:
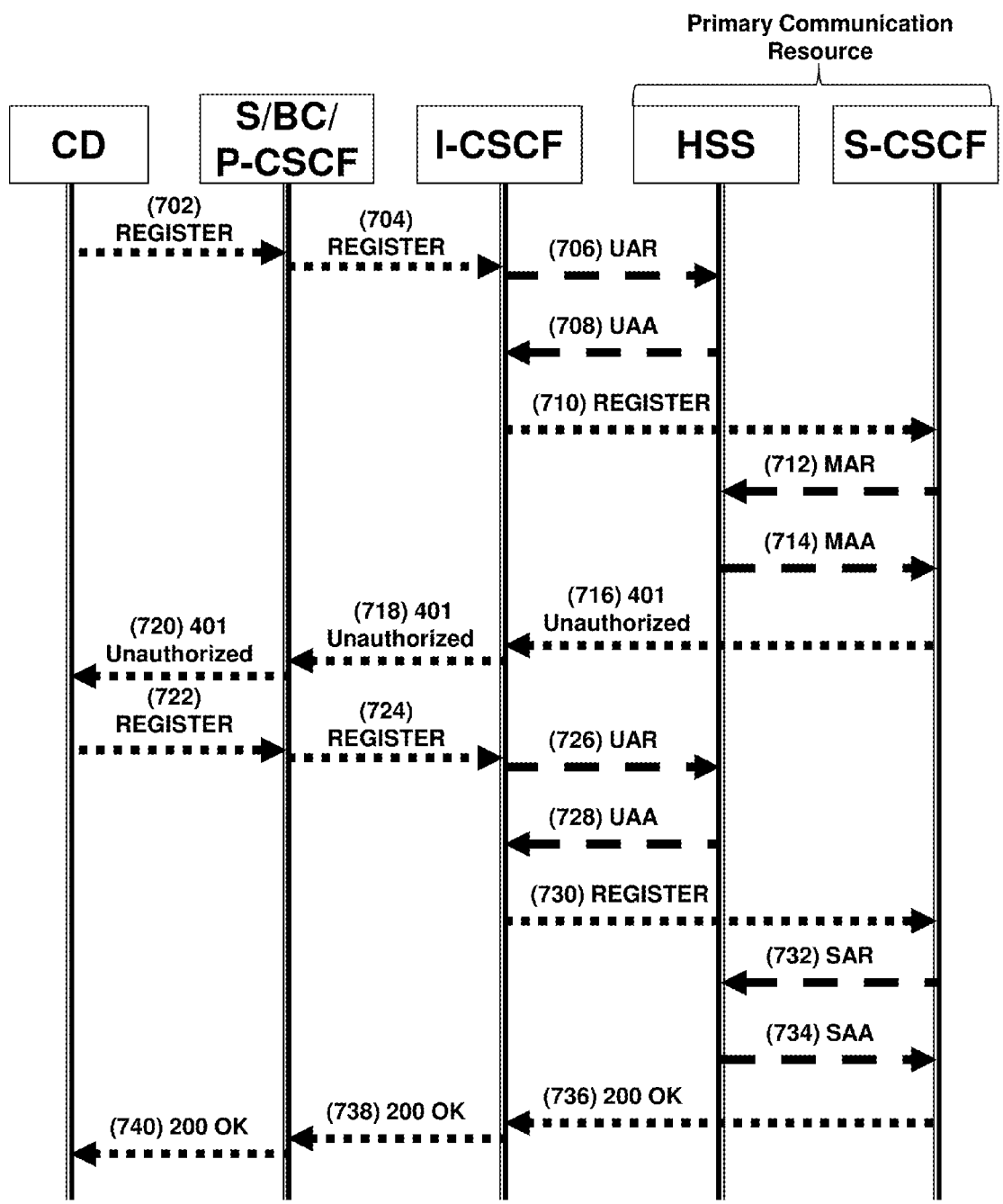
FIGS. 7-8 depict illustrative embodiments of flow diagrams.

Upon detecting no other pre-registered communication devices with a common PUID, the HSS 234 proceeds to step 312 where it supplies the I-CSCF 223 with a server capability index transmitted in a DIAMETER message in the form of a user authorization answer (UAA), at step 708 of FIG. 7. The I-CSCF 223 can utilize the server capability index to choose a primary S-CSCF from one or more S-CSCFs operating in server office 202 according to the index. In the present illustration, the I-CSCF 223 selects in step 316 a primary S-CSCF shown illustratively as reference 222. At 710 of FIG. 7, the I-CSCF 223 transmits a registration request to the primary S-CSCF 222 of server office 202.

Upon receiving the registration request, the primary S-CSCF 222 can retrieve at step 318 from the HSS 234 authentication information associated with the CD 205. This step can be accomplished by the primary S-CSCF 222 of server office 202 transmitting to the HSS 234 a multimedia authentication request (MAR) DIAMETER message, at step 712, of FIG. 7. From this MAR message, the HSS 234 identifies the primary S-CSCF 222 selected by the I-CSCF 223, which it records in its memory banks (or another accessible memory location, including a network memory location) and associates with CD 205. The HSS 234 in turn can reply, at step 714 of FIG. 7, with a multimedia authentication answer (MAA) DIAMETER message that includes the authentication information requested by the primary S-CSCF 222.

At 318, the primary S-CSCF 222 can transmit an authentication challenge to the CD 205 as depicted by steps 716 through 720. The authentication challenge can force the CD 205 to submit credentials in a new registration message as depicted by steps 722 through 730. In this registration process, the CD 205 provides the primary S-CSCF 222 authentication data with the registration message. The primary S-CSCF 222 can compare this information to authentication data supplied by the HSS 234 to authenticate the CD 205.

If the authentication succeeds, the primary S-CSCF 222 can proceed to 320 where it retrieves a subscription profile associated with the CD 205. The primary S-CSCF 222 can accomplish this by transmitting to the HSS 234, at step 732 of FIG. 7, a server assignment request (SAR) DIAMETER message. The HSS 234 can respond, at step 734, with a server assignment (SAA) DIAMETER message which includes the subscription profile. The primary S-CSCF 222 can then notify the CD 205, at step 322, that it is registered with the IMS network 200 as depicted by steps 736 through 740 of FIG. 7.

The subscription profile can include initial filter criteria (iFCs) data which can be used to provision the application servers 224 of associated with the primary S-CSCF 222 (which will be referred to as primary application servers 224). iFCs can be used for providing call origination features such as caller ID blocking, 7-digit dialing, and so on as described earlier for FIG. 1. Each iFC can have two URIs, one that points to the primary application server 224 associated with the iFC, and another that points to a secondary application server 244 associated with the same iFC for backup communication services. At step 320, the primary S-CSCF 222 can retrieve the iFCs from the subscription profile and register the CD 205 with the primary application servers 224 of server office 202. Once this is accomplished, at step 322, the primary S-CSCF 222 can return an acknowledgment to the CD 205 indicating that the registration was successful.

To establish a backup communication service, the CD 205 can be further adapted at step 324 to initiate a second SIP registration request which it forwards to the S/BC 247 of access office 246. The second SIP registration request can include an indicator that specifies that the CD 205 desires backup communication services from the IMS network 200. The flow diagram of FIG. 8 describes how backup services may be established. The S/BC 247 submits the request to the P-CSCF 209 which in turn forwards the request to the I-CSCF 243 of server office 204, which queries the HSS 234.

Figure 8:
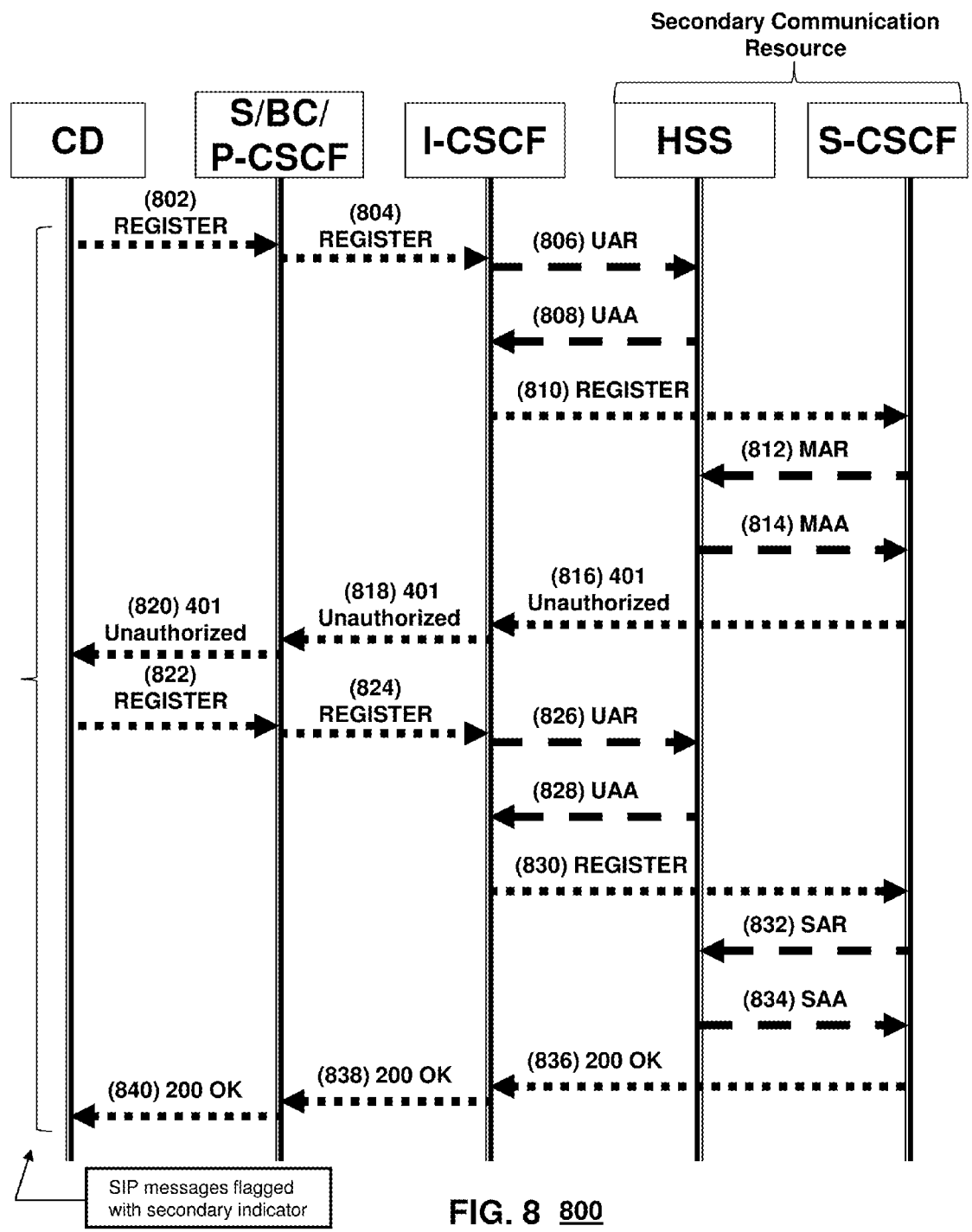

Steps 324 through 326 are depicted by steps 802 and 806 of FIG. 8. The I-CSCF 243 detects the indicator in the second SIP registration request, and determines from this indicator that backup communication services are requested. The I-CSCF 243 can construct a UAR DIAMETER message that conforms to a diameter base protocol that is modified from current standards (such as defined by Request for Comments (RFC) 3588) to support a second registration indication in an attribute value pair (AVP) field of the UAR DIAMETER message.

The second registration indication included in the UAR DIAMETER message can inform the HSS 234 that the CD 205 is requesting backup services. At step 328 the HSS 234 can determine if another communication device sharing a common PUID has registered with the IMS network 200 thereby previously establishing primary and secondary S-CSCF resources. If a PUID match is not detected, the HSS 234 may assume that the CD 205 is the first to establish primary and secondary communication resources, and proceeds to step 330, where it transmits to the I-CSCF 243 a UAA DIAMETER message (see step 808 of FIG. 8) with a server capability index. Because of the second registration indication in the UAR DIAMETER message, the HSS 234 may know not to initiate a de-registration process that would deregister the CD 205 from the primary server office 202 as would commonly occur in prior art systems. Upon receiving the UAA DIAMETER message, I-CSCF 243 proceeds to step 332 where it selects from the server capability index a secondary S-CSCF shown illustratively as reference 242. At step 810 of FIG. 8, the I-CSCF 243 transmits a registration request to the secondary S-CSCF 222 at server office 204.

Upon receiving the SIP registration request from the I-CSCF 243, the secondary S-CSCF 242 can retrieve, at step 336, from the HSS 234 authentication information associated with the CD 205. This step can be accomplished by the secondary S-CSCF 242 of server office 204 transmitting to the HSS 234 a multimedia authentication request MAR DIAMETER message, at step 812, of FIG. 8. The MAR DIAMETER message includes the second registration indication in the AVP field of the MAR DIAMETER message. The HSS 234 may determine from the MAR DIAMETER message that the I-CSCF 243 has selected the secondary S-CSCF 242, and may record this selection in its memory (or another accessible memory location, including a network memory location). The HSS 234 also detects from the second registration indication in the AVP field that the MAR DIAMETER message is associated with establishing backup services for the CD 205 and thereby does not initiate a deregistration of the CD 205 from the primary server office 202. The HSS 234 can in turn reply, at step 814, with a multimedia authentication answer MAA DIAMETER message that includes the authentication information requested by the secondary S-CSCF 242.

At step 336, the secondary S-CSCF 242 has the option to transmit another authentication challenge to the CD 205 as depicted by steps 816 through 820. The authentication challenge can once again force the CD 205 to submit credentials in a new registration message as depicted at steps 822 through 830. In this registration process, the CD 205 provides the secondary S-CSCF 242 authentication data with the registration message. The secondary S-CSCF 242 can compare this information to authentication data supplied by the HSS 234 to authenticate the CD 205.

If the authentication succeeds, the secondary S-CSCF 242 can proceed to 338 where it retrieves a subscription profile associated with the CD 205. The secondary S-CSCF 242 can accomplish this by transmitting to the HSS 234, at step 832 of FIG. 8, a server assignment request SAR DIAMETER message. Once again the SAR DIAMETER message includes an AVP field with the second registration indication to prevent the HSS 234 from deregistering the CD 205 from the primary sever office 202. The HSS 234 can respond, at step 834, with a server assignment SAA DIAMETER command which includes the subscription profile. The secondary S-CSCF 242 can then notify the CD 205, at step 340, that it is registered with the IMS network 200 as depicted at steps 836 through 840 of FIG. 8. If some iFCs provide the information (e.g., server URI) for both primary and secondary application server instances, the S-CSCF will send a $3^{rd}$-party registration request to the secondary application server. The $3^{rd}$-party registration request will also flag the secondary indication.

The above embodiments describe a first registration of a single communication device of a user. Assume CD 205 has completed the primary and secondary registrations described above. Further assume that another communication device of the user sharing a common PUID attempts to register with the IMS network 200 of FIG. 2. The registration request can emerge from other access offices not shown in FIG. 2. During the registration process, the steps of FIG. 3 would take place as described above. However, at step 310, the HSS 234 (or another HSS in the IMS network 200) would detect that the PUID of CD 205 and the PUID of the second communication device of the user match. In this instance, an I-CSCF serving the second communication device of the user (which may differ from the I-CSCF 223 of server office 202) may be directed by the HSS 234 (or another HSS) to step 314. In this step the I-CSCF would decide to register the second communication device of the user with the primary S-CSCF 222 selected for CD 205. The primary S-CSCF 222 would continue the registration process as previously described at step 318 and subsequent steps thereafter.

Upon the second communication device initiating a second registration request for a secondary communication resource, the HSS 234 (or another HSS in the IMS network 200) would detect at step 328 that the PUID of CD 205 and the PUID of the second communication device of the user match. The I-CSCF serving the second communication device of the user (which may differ from the I-CSCF 243 of server office 204) may be directed by the HSS 234 to step 334. In this step, the HSS responds with the secondary S-CSCF server name to which the CD had previously registered. The I-CSCF can register the second communication device of the user with the secondary S-CSCF 243 selected for CD 205 or another S-CSCF listed in the server capability index. Assuming the former, the secondary S-CSCF 242 would continue the registration process as previously described at step 336 and subsequent steps thereafter.

Based on the aforementioned embodiments, any number of communication devices of a user sharing a common PUID will share the same primary and secondary S-CSCF's 222 and 242 regardless of which access offices each device may be utilizing.

It is further noted that a determination of which S-CSCF from which server office 204 will provide backup services to the CD 205 can be preconfigured in the IMS network 200, notably in all P-CSCFs, I-CSCFs and S-CSCFs. Each P-CSCF and I-CSCF can be preconfigured with a table of S-CSCFs and their companion secondary S-CSCFs, respectively. Additionally, each S-CSCF can be preconfigured with the information of its remote secondary S-CSCF. In one embodiment, each application server can also be preconfigured with information that identifies a remote secondary application server which provides backup services. In one embodiment, the primary and secondary application servers can be identified in the iFCs of the CD 205, which can provide more flexibility to manage the IMS network 200 of FIG. 2.

It is also noted that the selection of server office 204 as a backup communication service can be based on a geographic disparity between server offices 202 and 204 or other criteria (such as load balancing, bandwidth utilization, etc.) suitable for satisfying the service provider's business or technical objectives.

Once registration process described above has been completed, the CD 205 (and other communication devices of the user), the P-CSCF 209 of access office 206, and the I-CSCF 223 of the primary server office 202 can be configured to redirect communications from the primary server office 202 to the secondary server office 204 upon detecting a communication fault or other event that prevents utilization of the primary server office 202 for processing calls. Furthermore, in some embodiments, one or more registration processes may support registrations with more than two resources (e.g., primary and secondary communication resources). For example, there may be a registration for a tertiary communication resource, which enables access via a tertiary server office. Where more than one backup communication resource is available, the selection of a backup communication resources upon failure (e.g., of a primary communication resource) may be based upon current load, capacity, throughput and/or other measure of availability of a communication resource or based upon proximity of a CD to the respective backup communication resources.

Figure 4:
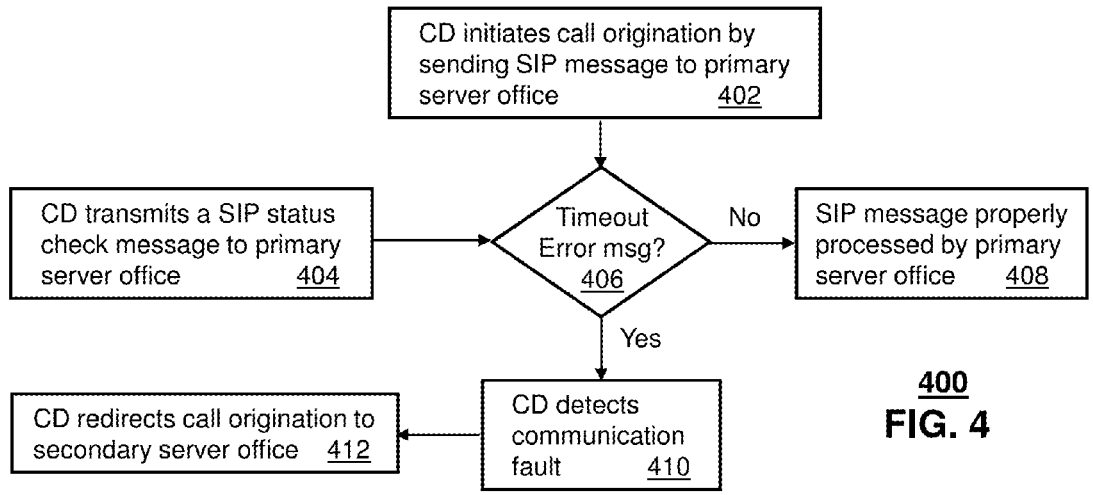

Referring to FIG. 4, method 400 describes illustrative embodiments in which the CD 205 redirects a call to the secondary server office 204. At step 402, the CD 205 can initiate a call origination directed to a second communication device, which it forwards to access office 206. In response, the P-CSCF 209 can transmit a SIP INVITE message as previously described for FIG. 1 to the primary S-CSCF 222 for processing. If the primary S-CSCF 222 is operating properly, it will process the SIP INVITE message, at step 408, and establish a call with a second communication device as previously described in FIG. 1.

If, however, the primary S-CSCF 222 or other network elements of the primary server office 202 such as, for example, the primary application servers 224 are malfunctioning or unavailable and the CD 205 fails to receive, at step 406, a response within a timeout period established by the service provider, the CD 205 can attempt a retransmission of the SIP INVITE message. If a response timeout is encountered again, at step 406, and the number of retransmissions exceeds a predetermined threshold set by the service provider, then the CD 205 can proceed to step 410 where it identifies a communication fault, and redirects the call to the secondary server office 204 by submitting a SIP INVITE message to access office 246.

The CD 205 can decide that the primary server office 202 is not available for service when the primary server office 202 does not respond to SIP requests or the CD 205 receives, for example, a SIP 408 or 503 error message, at step 406, which may indicate system level faults in any one of the network elements of access office 206 or the primary server office 202. For example, an example error message could indicate a server or network unavailability, communication slowness or congestion, or type of failure. To detect communication faults early, the CD 205 can submit, at step 404, SIP status check messages to the primary server office 202. If no response is detected after the timeout period and retransmissions have exceeded an established threshold, then the CD 205 can proceed to steps 410 and 412 as previously described.

Figure 5:
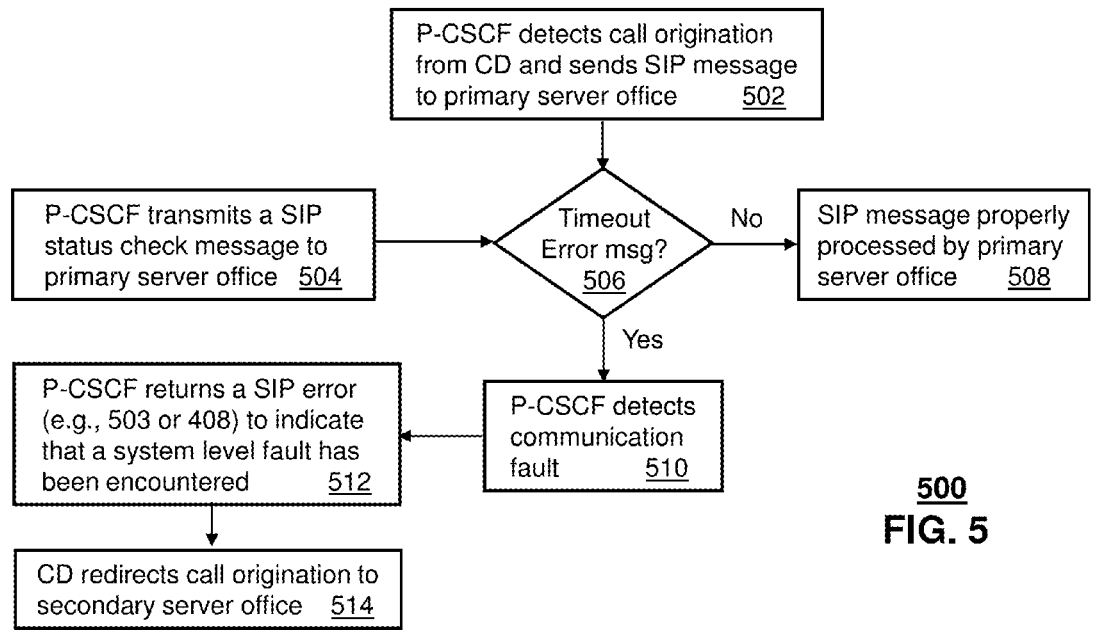

Referring to FIG. 5, method 500 describes illustrative embodiments in which the P-CSCF 209 of access office 206 may redirect calls to the secondary S-CSCF 242 of server office 204. At step 502, the P-CSCF 209 can detect a call origination initiated by the CD 205 at access office 206. In response, the P-CSCF 209 can transmit a SIP INVITE message as previously described for FIG. 1 to the primary S-CSCF 222 for processing. If the primary S-CSCF 222 is operating properly, it will process the SIP INVITE message, at step 508, and establish a call between the CD 205 and a second communication device as previously described.

If, however, the primary S-CSCF 222 or other network elements such as, for example, the primary application servers 224 in the primary server office 202 are malfunctioning or unavailable and the P-CSCF 209 of access office 206 fails to detect, at step 506, a response within a timeout period established by the service provider, the P-CSCF 209 can attempt a retransmission of the SIP INVITE message. If a response timeout is encountered again, at step 506, and the number of retransmissions exceeds a predetermined threshold set by the service provider, then the P-CSCF 209 can proceed to step 510 where it identifies a communication fault, and returns to the CD 205 a SIP error message (e.g., 503 or 408) at step 512 to indicate that a system level fault has been encountered, which directs the CD 205 to redirect the call origination at step 514 to the secondary server office.

A P-CSCF 209 can decide that a primary S-CSCF 222 is not available for service when the primary S-CSCF 222 does not respond to SIP requests from the P-CSCF or it receives a SIP 408 or 503 error message, at step 506, to indicate system level faults in the primary server office 202. To detect communication faults early, the P-CSCF 209 can submit, at step 504, SIP status check messages to the primary S-CSCF 222. If no response is detected after the timeout period and retransmissions have exceeded an established threshold, then the P-CSCF 209 can proceed to steps 510 and 512 as previously described.

Figure 6:
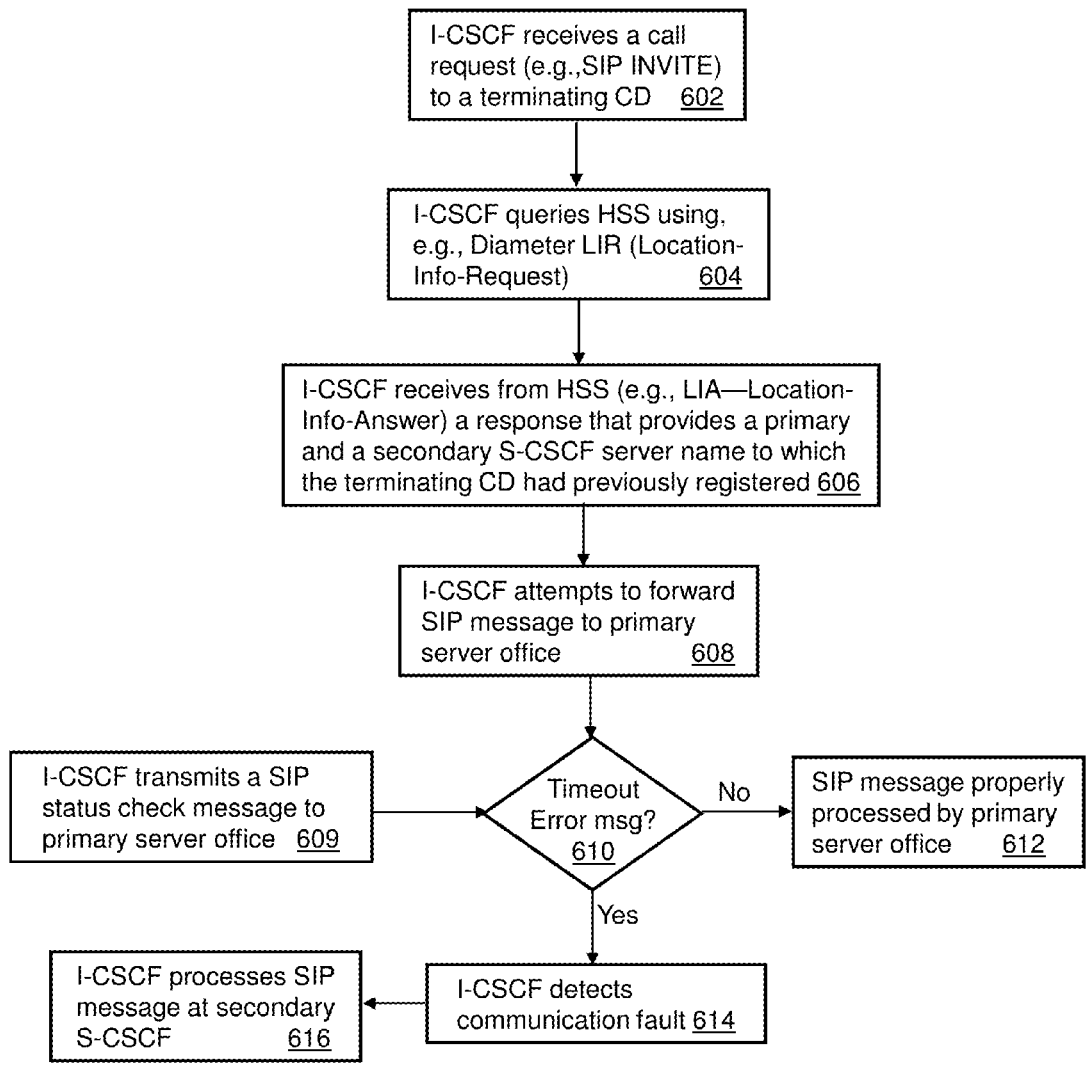

Referring to FIG. 6, method 600 describes illustrative embodiments in which the I-CSCF 222 can redirect calls to the secondary server office 204 when an unrecoverable or serious communication fault is detected at the primary server office 202. At step 602, the I-CSCF 223 can receive a call origination SIP message as previously described for FIG. 1 and query the HSS at step 604. The I-CSCF 223 can receive from the HSS 234 at step 604 an identification of the primary S-CSCF 222 and secondary S-CSCF 242 server names. In one embodiment, the I-CSCF in step 608 forwards the SIP message to the primary S-CSCF 222 in step 608. Step 612 represents that communications between the I-CSCF 223 and the primary S-CSCF 222 are successful in reaching the terminating communication device as was described for FIG. 1.

If, however, the I-CSCF 223 attempts to communicate with the primary S-CSCF 222 at step 608 and no response is detected after the timeout period, or an error message such as SIP 408 or 503 is detected at step 610 and retransmissions have exceeded an established threshold, then the I-CSCF 223 can proceed to step 614 where it determines an unrecoverable or serious communication fault has occurred. At step 616, the I-CSCF 223 can establish communications with the secondary S-CSCF 242 and complete the call from the secondary server office 204. At step 609, the I-CSCF 223 can also be adapted to transmit status check messages to the primary S-CSCF 222. If no response is received within a timeout period at step 610, and retransmission attempts have exceeded a threshold set by the service provider, then the I-CSCF 223 can resort to utilizing the secondary S-CSCF 242 as described in steps 614 and 616.

Figure 9:
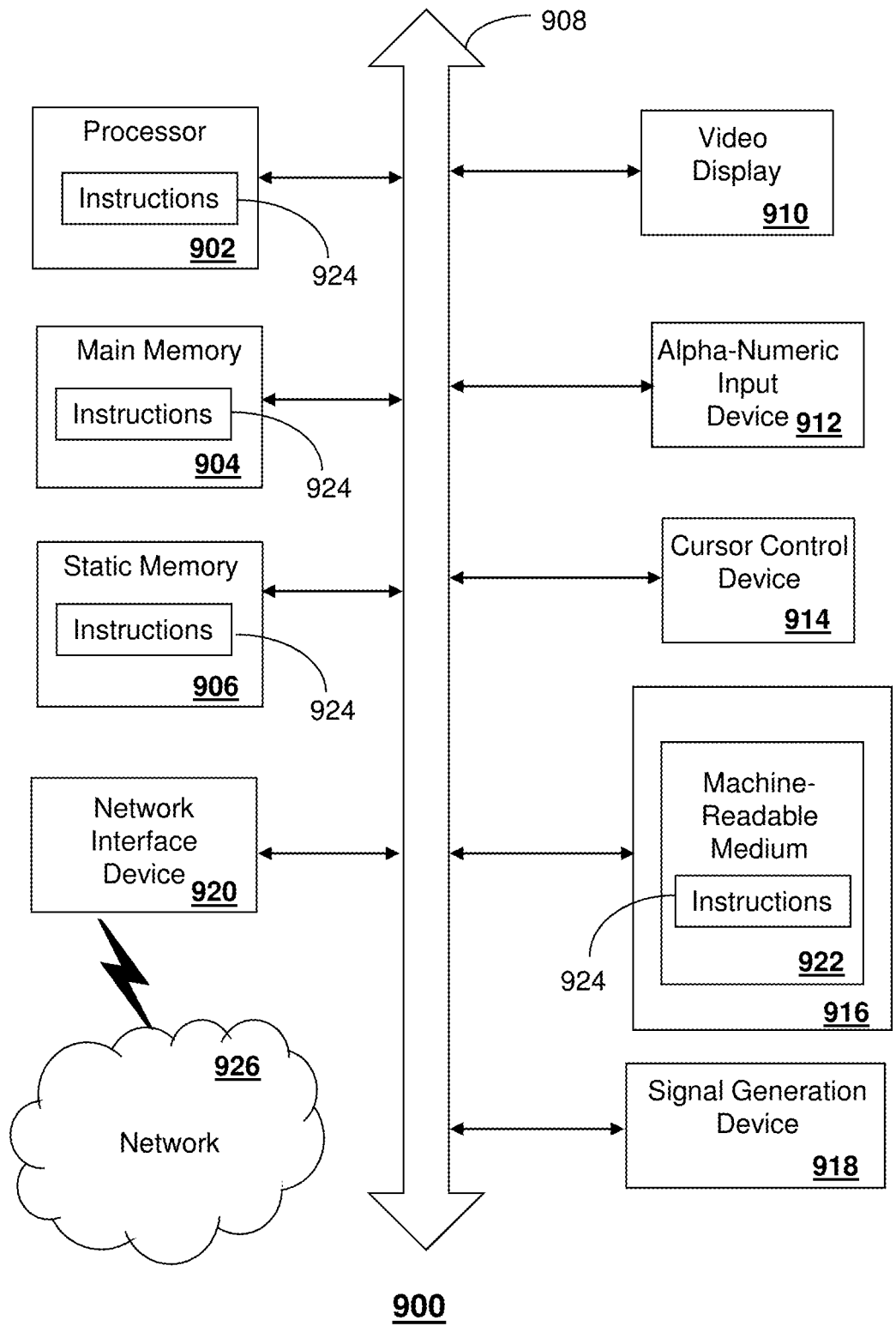
FIG. 9 is a diagrammatic representation of a machine in the form of a computer system within which a set of instructions, when executed, may cause the machine to perform any one or more of the methods discussed herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the CDs and the network elements of the IMS networks shown in FIGS. 1-2 as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a non-transitory machine-readable medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The subject disclosure contemplates a machine readable medium containing instructions 924, or that which receives and executes instructions 924 from a propagated signal so that a device connected to a network environment 926 can send or receive voice, video or data, and to communicate over a network 926 using the instructions 924. The instructions 924 may further be transmitted or received over the network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the subject disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device, comprising computer instructions, which when executed by a processor causes the processor to perform operations comprising:
    transmitting a first session initiation protocol registration message to an internet protocol multimedia subsystem network;
    receiving a first acknowledgment from the internet protocol multimedia subsystem network indicating that a communication device has registered with a primary communication resource in the internet protocol multimedia subsystem network;
    transmitting a second session initiation protocol registration message to the internet protocol multimedia subsystem network, wherein the second session initiation protocol registration message comprises an indicator for registering the communication device with a secondary communication resource in the internet protocol multimedia subsystem network;
    receiving a second acknowledgment from the internet protocol multimedia subsystem network indicating that the communication device has registered with the secondary communication resource;
    transmitting a first session initiation protocol origination message to the primary communication resource of the internet protocol multimedia subsystem network to establish a communication session with a second communication device;
    detecting that the primary communication resource of the internet protocol multimedia subsystem network is unavailable to establish the communication session; and
    transmitting a second session initiation protocol origination message to the secondary communication resource to establish the communication session with the second communication device,
    wherein the first session initiation protocol registration message is received by a first proxy call session control function device, wherein the first proxy call session control function device transmits the first session initiation protocol registration message to a first interrogating call session control function device that selects a primary serving call session control function device of the primary communication resource, and wherein the primary serving call session control function device registers the communication device with a primary application server of the primary communication resource.

2. The computer-readable storage device of claim 1, wherein the indicator corresponds to a request for secondary registration to provide the communication device a backup communication service.

3. The computer-readable storage device of claim 1, wherein the first interrogating call session control function device receives a first server capability index from a home subscriber server device, and wherein the first interrogating call session control function selects the primary serving call session control function device from the first server capability index.

4. The computer-readable storage device of claim 3, wherein the second session initiation protocol registration message is received by a second proxy call session control function device, wherein the second proxy call session control function device transmits the second session initiation protocol registration message to a second interrogating call session control function device, and wherein the second interrogating call session control function device determines from the indicator in the second session initiation protocol registration message that the communication device is to be registered with the secondary communication resource.

5. The computer-readable storage device of claim 4, wherein the second interrogating call session control function device selects a secondary serving call session control function device of the secondary communication resource, and wherein the secondary serving call session control function device registers the communication device with a secondary application server of the secondary communication resource.

6. The computer-readable storage device of claim 4, wherein the second interrogating call session control function device receives a second server capability index from the home subscriber server device or an alternate home subscriber server storing similar information as the home subscriber server, and wherein the second interrogating call session control function selects a secondary serving call session control function device from the second server capability index.

7. The computer-readable storage device of claim 4, wherein the home subscriber server or an alternate home subscriber server storing similar information as the home subscriber server transmits a message to the second interrogating call session control function device based on the indicator in the second session initiation protocol registration message, and wherein the message directs the second interrogating call session control function device to initiate a secondary registration of the communication device without de-registering the communication device from the primary communication resource.

8. The computer-readable storage device of claim 7, wherein the indicator corresponds to a second registration indication, wherein a message exchanged between the second interrogating call session control function, the home subscriber server or the alternate home subscriber server storing similar information as the home subscriber server, or a secondary serving call session control function conforms to a modified diameter base protocol, and wherein the modified diameter base protocol includes the second registration indication in an attribute value pair field of each message.

9. The computer-readable storage device of claim 6, wherein one of the home subscriber server or the alternate home subscriber server stores a first identity associated with the primary serving call session control function device and a second identity associated with a secondary serving call session control function device.

10. The computer-readable storage device of claim 9, wherein the home subscriber server or the alternate home subscriber server receives a request associated with a registration request initiated by a third communication device having a public user identity that matches a first public user identity associated with the communication device, and wherein the home subscriber server or the alternate home subscriber server responds to the request by transmitting a message comprising one of the first identity of the primary serving call session control function or the second identity of the secondary serving call session control function device to cause the third communication device to be registered with the primary serving call session control function and the secondary serving call session control function device.

11. The computer-readable storage device of claim 10, wherein the transmitted message includes an attribute value pair field corresponding to a secondary server name comprising the second identity associated with the secondary serving call session control function device.

12. An interrogating call session control function device, comprising:
a memory to store instructions; and
a processor coupled to the memory, wherein responsive to executing the instructions, the processor performs operations comprising:
receiving a first registration request initiated by a first communication device;
transmitting a request to a home subscriber server device responsive to receiving the first registration request;
receiving from the home subscriber server a first message comprising a first identity of a primary communication resource, wherein the home subscriber server device transmits the first message responsive to detecting that a first identity of the first communication device matches a second identity of a second communication device, and wherein the second communication device is registered with the primary communication resource; and
registering the first communication device with the primary communication resource,
wherein the first communication device transmits a second registration request, wherein the home subscriber server receives a request associated with the second registration request, wherein the home subscriber server responds to the second registration request by transmitting a second message comprising a second identity of a secondary communication resource to which the second communication device is registered, and wherein the home subscriber server transmits the second message responsive to detecting that the first identity of the first communication device matches the second identity of the second communication device.

13. The interrogating call session control function device of claim 12, wherein the operations further comprise registering the first communication device with the primary communication resource without de-registering the second communication device from the primary communication resource.

14. The interrogating call session control function of claim 12, wherein the first identity of the first communication device comprises a first public user identity, wherein the second identity of the second communication device comprises a second public user identity, wherein the home subscriber server detects that the first public user identity matches the second public user identity and responsive to the match transmits the first and second messages.

15. The interrogating call session control function of claim 12, wherein primary communication resource is a primary serving call session control function device, and wherein the secondary communication resource is a secondary serving call session control function device, wherein the first and second messages conform to a modified diameter base protocol, and wherein the modified diameter base protocol includes an attribute value pair field corresponding to a secondary server name for including an identify of the secondary serving call session control function device.

16. The interrogating call session control function device of claim 12, wherein the second registration request comprises a second registration indication, wherein a message exchanged between the home subscriber server conforms to a modified diameter base protocol, and wherein the modified diameter base protocol includes the second registration indication in an attribute value pair field of each message.

17. A home subscriber server, comprising:
a memory to store instructions; and
a processor coupled to the memory, wherein responsive to executing the instructions, the processor performs operations comprising:
storing a first identity of a first communication device registered with a primary communication resource and a secondary communication resource;
receiving a request associated with a registration request initiated by a second communication device;
detecting a first match based on a second identity of the second communication device matching the first identity of the first communication device;
directing a registration of the second communication device with one of the primary communication resource or the secondary communication resource responsive to the detected first match;
storing the second identity of the second communication device;
receiving a second request associated with a second registration request initiated by the first communication device;
detecting a second match based on the first identity of the first communication device matching the second identity of the second communication device; and
directing a second registration of the first communication device with one of the primary communication resource or the secondary communication resource responsive to the detected second match.

18. The home subscriber server of claim 17, wherein the registration of the second communication device with one of the primary communication resource or the secondary communication resource occurs without deregistering the first communication device from one of the primary communication resource or the secondary communication resource.

* * * * *